Dec. 22, 1953

A. C. HOWARD 2,663,241

EARTH WORKING TOOL FOR THE ROTOR
OF ROTARY CULTIVATING MACHINES

Filed March 7, 1950

INVENTOR.
A.C. HOWARD
BY
Mawhinney & Mawhinney
Attys.

Patented Dec. 22, 1953

2,663,241

UNITED STATES PATENT OFFICE 2,663,241

EARTH WORKING TOOL FOR THE ROTOR OF ROTARY CULTIVATING MACHINES

Arthur Clifford Howard, East Horndon, England, assignor of one-half to Rotary Hoes Limited, East Horndon, Essex, England Application March 7, 1950, Serial No. 148,034

Claims priority, application Great Britain March 18, 1949

1 Claim. (Cl. 97—212)

This invention relates to an earth working tool, to extend in a generally radial direction from the rotor of a rotary cultivating machine, of which the rotor axis is transverse to the direction of travel of the machine.

The main object of the invention is to provide a tool of this kind which will enable the earth to be cultivated in an efficient manner.

According to the invention the tool, as viewed from the front when in its uppermost position on the rotor, is substantially of T-shape, comprising a stem carrying a head, and the front edge of the head is sharp-edged to provide a cutting edge, and extends well in advance of the front edge of the stem, which is also sharp-edged to provide a cutting edge.

Preferably the centre line of the head (in a plane at right angles to the rotor axis) curves radially-inwardly from the cutting edge to the opposite edge, i. e., is raked, by an amount which is related to the forward travel of the machine during the cut.

Conveniently the cutting edge of the head is centrally pointed, and when the head is relatively wide, to serve, in effect, as a spade, the cutting edge of the head, as viewed from above when the tool is in its uppermost position on the rotor, is V-shaped.

In this case the head, instead of being flat, may be of shallow V-shape in front elevation, so that as the cutting edge slants backwards it maintains its radial distance from the axis of the rotor so that it cuts a level bottom, and also maintains the same rake and cutting clearance throughout the length of the cutting edge during the forward travel of the machine.

Figure 1:
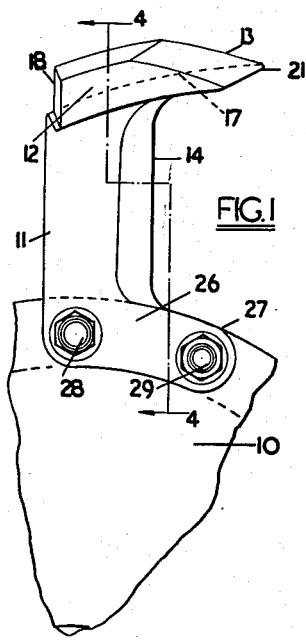
Figure 1 is a fragmentary view of a rotor of a rotary cultivating machine fitted with an earth working spade-type tool according to the invention, the tool being shown in its uppermost position.

With reference first to Figures 1 to 4, only part of the rotor 10 is shown. The tool is, it will be observed from Figures 2 and 4, generally of T-shape in front elevation, comprising a stem 11 carrying a head 12, and the front edge of the head is sharp-edged to provide a cutting edge 13 which extends well in advance of the front edge of the stem, which is also sharp-edged to provide a cutting edge 14.

The centre line 17 of the head (see Figure 1) in a plane at right angles to the axis of the rotor 10 curves radially-inwardly from the cutting edge 13 to the opposite edge 18, i. e., is raked, by an amount which is related to the forward travel of the machine during the cut.

In the example shown the cutting edge 13 is assumed to be approximately, say, 15 inches from the rotor axis, and the head is given a rake of $\frac{7}{16}$ of an inch per 5 degrees rotation of the rotor, so as to provide for a forward travel of the machine of 30 inches per revolution of the rotor.

Figure 2:
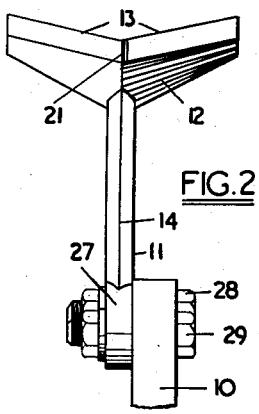
Figure 2 is an elevation of the tool from the front of the machine, i. e., from the right of Figure 1.
Figure 3:
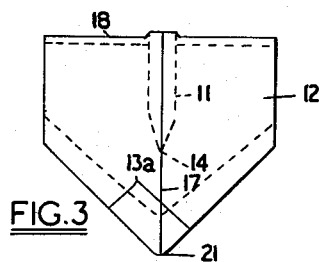
Figure 3 is a plan of the tool.

In Figures 1 to 3 the cutting edge of the head comes to a central point 21 and, in point of fact, the cutting edge, as viewed from above when the tool is in its uppermost position on the rotor, is V-shaped, as shown by Figure 3, the two cutting edges 13a being substantially at right angles to one another.

Figure 4:
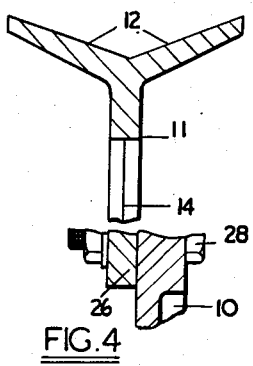
Figure 4 is a sectional elevation of the tool, taken mainly on the line 4—4 of Figure 1.

Furthermore, the head instead of being flat is of shallow V-shape when viewed from the front, as shown by Figures 2 and 4, so that as the cutting edge slants backwards it maintains its radial distance from the axis of the rotor so that it cuts a level bottom, and also maintains the same rake and cutting clearance throughout the length of the cutting edge during the forward travel of the machine.

Figure 1 also shows the end of the stem 11 opposite the head as having a foot 26 with a toe portion 27 extending well in advance of the cutting edge 14 of the stem, the opposite ends of the foot being both bolted, as shown at 28, 29, to the rotor 10. This method of supporting the tool from the rotor resists the tendency for the point 21 of the cutting edge of the head to be tilted outwardly.

It is preferred that the tool should be manufactured of cast steel. In the case of the tool shown its stem should be about $\frac{9}{16}$ of an inch thick in the axial direction of the rotor, as shown by Figure 2, and about 2½ inches wide in the circumferential direction of the rotor, as shown by Figure 1.

Thus, when cutting a sod with the spade-type implement of Figures 1 to 4, the sod cut by the head will be divided into two by the cutting edge 14 of the stem.

Figure 6:
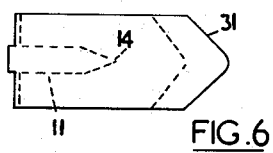
Figure 5:
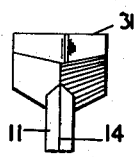
Figure 5 is a fragmentary front elevation, and Figure 6 a plan, showing a pick-type form of tool according to the invention.

The implement shown by Figures 5 and 6 is of the pick-type, which is preferred for cultivating hard and stony ground. This implement differs from that of Figures 1 to 4 mainly in that the overall width of the head, as viewed from the front in Figure 2 or in the plan view of Figure 3, is reduced to about one-third, and the head, which is again shown as having a cutting edge, 31, which is V-shaped in plan in Figure 6, is flat (Figure 5) instead of being of shallow V-shape, though it still extends well forwardly of the cutting edge 14 of the stem 11. The tool is, in fact, of narrow-headed T-shape, as viewed in Figure 5.

What I claim as my invention and desire to secure by Letters Patent of the United States is:

For use with the rotor of a rotary cultivating machine of which the rotor axis is transverse to the direction of travel of the machine, an earth working tool comprising a stem the longitudinal axis of which is adapted to fall on a radius of said rotor, a pair of beveled cutting edges along one longitudinal edge of said stem, an attaching root at one end of said stem, said attaching root being adapted to overlie a greater portion of the surface of said rotor than said stem, said root having openings therethrough adapted to receive retaining means for securing said tool to said rotor, an earth working head secured to said stem at its end opposite from said root, the leading portion of said stem to which said head is connected being a radial curve, said head having upwardly divergent flanges forming with said stem a Y, the leading edges of said head being triangular in form with the apex of said triangle being positioned in advance of the beveled cutting edges of said stem, and upper and lower beveled cutting edges on the leading triangular portion of said head.

ARTHUR CLIFFORD HOWARD.

References Cited in the file of this patent

UNITED STATES PATENTS

| Number | Name | Date |
|---|---|---|
| 1,070,192 | Seck | Aug. 12, 1913 |
| 1,661,692 | Everist | Mar. 6, 1928 |
| 2,083,662 | Paris | June 15, 1937 |
| 2,168,733 | Dufour | Aug. 8, 1939 |

FOREIGN PATENTS

| Number | Country | Date |
|---|---|---|
| 109,979 | Australia | Mar. 14, 1940 |